No. 774,219. PATENTED NOV. 8, 1904.
J. N. WHITTINGHILL.
TRACK CLEARER AND DIVIDER.
APPLICATION FILED JULY 8, 1904.
NO MODEL.
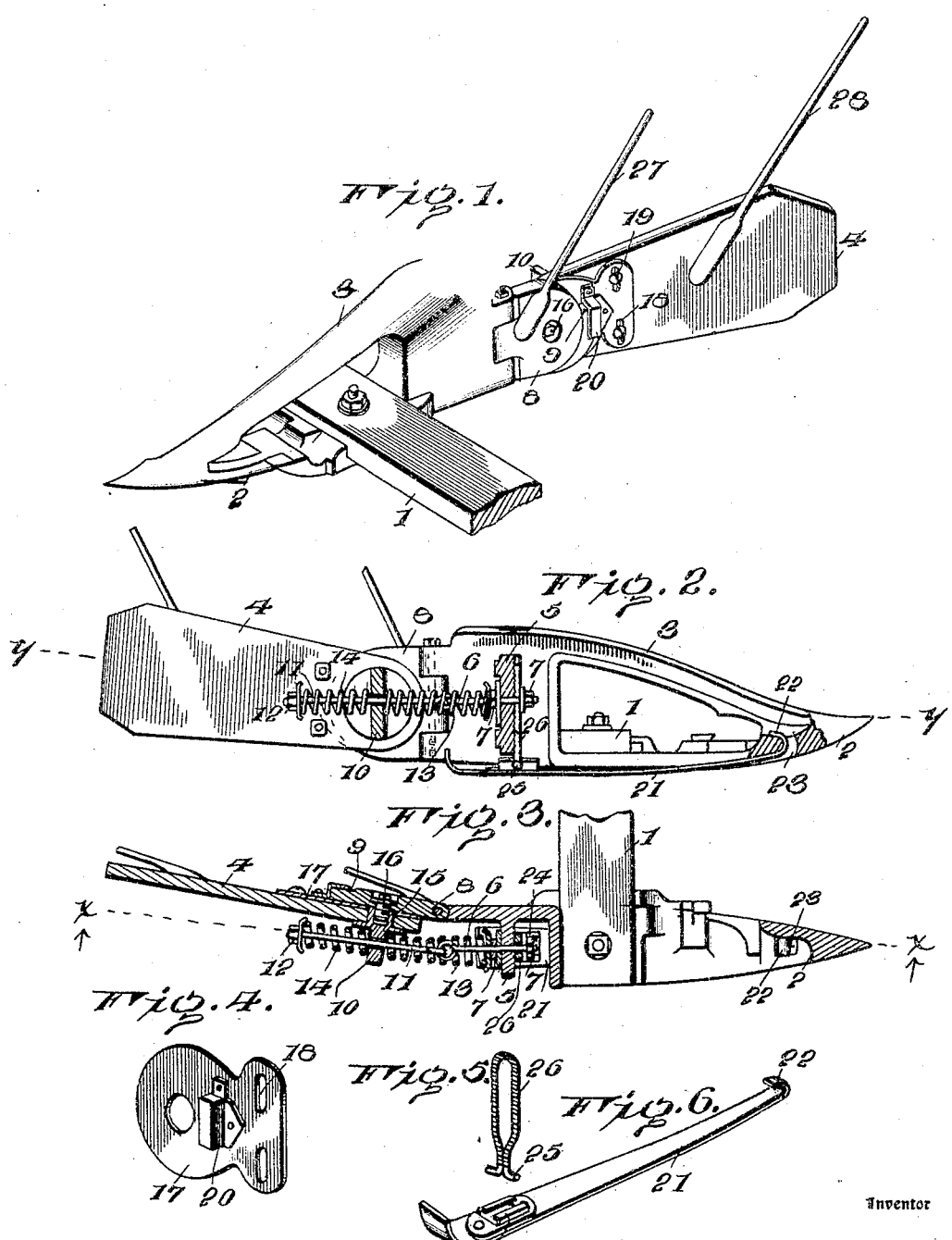

No. 774,219.

Patented November 8, 1904.

UNITED STATES PATENT OFFICE.

JOHN N. WHITTINGHILL, OF ELLSWORTH, INDIANA.

TRACK-CLEARER AND DIVIDER.

SPECIFICATION forming part of Letters Patent No. 774,219, dated November 8, 1904.

Application filed July 8, 1904. Serial No. 215,810. (No model.)

*To all whom it may concern:*

Be it known that I, JOHN N. WHITTINGHILL, a citizen of the United States, residing at Ellsworth, in the county of Dubois and State of Indiana, have invented certain new and useful Improvements in Track-Clearers and Dividers, of which the following is a specification.

In mowers and like agricultural machinery devised for harvesting crops the finger-bar provided with the cutting mechanism is supplied at its outer end with means for separating the standing grain from that in the path of the cutting mechanism and with means for clearing the track adjacent to the standing grain to prevent entanglement therewith of the cut grain.

The present invention has relation to the dividing and track-clearing means and aims to provide a construction which will admit of the track-clearer yielding when meeting with an obstruction, thereby preventing disabling of the track-clearing means, which is the source of considerable annoyance, delay, and expense in making repairs.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a divider and track-clearer embodying the invention. Fig. 2 is a longitudinal section thereof on the line *x x* of Fig. 3 looking in the direction of the arrows. Fig. 3 is a plan section of the invention on the line *y y* of Fig. 2. Fig. 4 is a perspective view of the plate secured to the clearer and coming between it and the member hinged to the divider. Fig. 5 is a detail perspective view of the hanger for adjustably supporting the rear end of the runner. Fig. 6 is a detail perspective view of the runner.

Corresponding and like parts are referred to in the following description and indicated in all the views of the drawings by the same reference characters.

The finger-bar is indicated at 1 and may be of any desired construction. The divider 2 is secured to the outer end of the finger-bar and is provided along its upper edge with an outer flange 3, which widens from front to rear, so as to push the grain away from the connections at the outer side of the divider between it and the clearer 4. The base of the divider 2 is broad and forwardly tapered to a point, and the vertical portion is apertured for the sake of lightness and admits of securing the outer end of the finger-bar 1 to the base, as indicated most clearly in Fig. 1. A lug 5 projects laterally from the rear portion of the divider 2 and is apertured to receive an eyebolt 6, adjustably connected thereto by clamp-nuts 7, threaded upon the shank of the eyebolt and arranged upon opposite sides of the lug 5. A member 8 is hinged to the rear end of the divider 2, so as to swing laterally, and its rear edge is formed on the arc of a circle and is shouldered, as shown at 9, to form a stop to limit the downward movement of the clearer 4 at its rear end.

The clearer 4 consists of a board or plate pivoted near its front end to the hinged member 8, so as to have a free vertical movement at its rear end, which normally inclines inward, so as to throw the cut grain away from the standing grain and provide a well-defined path or space, so that upon the return travel of the machine the standing grain will be entirely free of the grain previously cut. A lug 10 projects laterally from the clearer 4 and is apertured for the passage of a rod 11, which is loosely connected at its front end to the eyebolt 6 and is provided at its rear end with a set-nut 12. A coil-spring 13 is mounted upon the rear portion of the eyebolt and the front portion of the rod 11 and is confined between the lugs 5 and 10 and normally exerts a pressure upon the lug 10 to hold the clearer 4 inwardly inclined at its rear end. A spring 14 is mounted upon the rear portion of the rod 11 and is confined between the lug 10 and set-nut 12 and acts in conjunction with the spring 13 to hold the clearer 4 in determinate position. In the event of the rear portion of the clearer 4 being pressed inward from any cause the spring 14 is compressed, and after the clearer has been relieved of the lateral pressure the spring 14, regaining itself, returns the clearer to a normal position, as will be readily understood. The joint between the eyebolt 6 and rod 11 comes about opposite to the joint of the clearer 4 with the divider 2. By having the eyebolt 6 adjustably connected with the lug 5 the inclination of the clearer 4 to the line of draft may be varied.

The lug 10 is separate from the clearer 4 and is provided upon its inner side with a journal 15, upon which the clearer 4 is pivotally mounted. A machine screw or fastening 16 connects the lug 10 to the hinged member 8, and its headed end is countersunk in the latter, as indicated most clearly in Fig. 3. A plate 17 is mounted upon the journal 15 and is interposed between the clearer 4 and hinged member 8 and normally exerts a pressure upon the latter to prevent a too free movement of the clearer upon its pivotal connection with said hinged member. The rear portion of the plate 17 is provided with vertical elongated openings 18, through which fastenings 19 pass for adjustably connecting said plate to the clearer. A keeper 20 is attached to or formed with the plate 17 and receives a portion of the rear end of the hinged member 8, thereby strengthening the joint between them and preventing relative lateral movement of the parts 4 and 8. The upper end of the keeper 20 is closed and is adapted to engage with the shoulder or stop 9 and limit the downward movement of the clearer at its rear end. Obviously by adjusting the plate 17 with reference to the clearer 4 the downward movement of the latter at its rear end may be regulated.

A runner 21 is fitted to the lower side of the divider 2, and its front end is hooked, as shown at 22, and its rear end upwardly curved. The hook 22 passes through an opening 23 near the toe of the divider and engages therewith, whereas the rear portion is provided with inner flanges 24 to engage over outer extensions 25 at the lower end of a slotted hanger 26. The flanges 24 are parts of a plate secured to the rear portion of the runner 21 or, if preferred, may form a part thereof. The slotted hanger 26 is secured to the lug 5 in any manner to admit of the rear portion of the runner being vertically adjusted to support the outer end of the finger-bar at the required elevation from the ground, according to the height of the cut. The eyebolt 6 is utilized as the means for securing the hanger 26 to the lug 5, and to prevent possible slipping the opposing sides of the hanger and lug 5 are toothed or roughened. A bar 27 projects upward and rearward from the hinged member 8, and a companion bar 28 projects upward and rearward from the rear portion of the clearer 4, and these two bars, in conjunction with the clearer, throw the cut grain away from the standing grain.

Having thus described the invention, what is claimed as new is—

1. A grain-divider having an outer lug near its rear end and having an outer flange along its upper edge rearwardly widened, a runner loosely connected at its front end to the forward portion of the divider, a hanger having loose connection with the rear portion of the runner, and means for adjustably connecting the hanger with said lug, substantially as set forth.

2. In combination, a divider, a clearer pivotally connected thereto to swing laterally at its rear end, a yielding connection between the clearer and divider, and means for adjusting said yielding connection to vary the lateral inclination of the clearer with reference to the line of draft, substantially as set forth.

3. In combination, a divider provided with a lateral extension, a clearer pivotally connected to the divider and having a corresponding lateral extension, connecting means between said lateral extensions, and springs mounted upon said connecting means, one of the springs being confined between the said lateral extensions and the other confined between the lateral extension of the clearer and the rear end of said connecting means, substantially as specified.

4. In combination, a divider, a clearer pivotally connected thereto, a bolt or like part connected to the divider, a rod having running or loose connection with the clearer and loosely connected to said bolt about opposite to the pivot-joint between the clearer and divider, and springs mounted upon said rod and exerting a pressure upon the clearer to hold the latter in determinate position, substantially as set forth.

5. In combination, a divider having a rearwardly-extended member provided with a shouldered curved portion, a clearer pivoted to the rearwardly-extended member, and a keeper extended from the clearer for coöperation with said shouldered curved portion to prevent relative lateral play of the clearer and limit its downward movement, substantially as set forth.

6. In combination, a divider having a rearwardly-extended member, a clearer pivoted to said rearwardly-extended member to move vertically at its rear end, and a plate interposed between said clearer and rearwardly-extended member and normally exerting a lateral pressure upon said parts and adapted to limit the downward movement of the clearer at its rear end, substantially as specified.

7. In combination, a divider having a rearwardly-extended member, a clearer pivoted to said member and adapted to move vertically at its rear end, a plate adjustably connected to the clearer, and means between said plate and the rearwardly-extended member to limit the downward movement of the clearer, substantially as specified.

8. In combination, a divider, a member hinged thereto to swing laterally, a clearer pivoted to the hinged member to move vertically at its rear end, and a yielding connection between the divider and clearer, substantially as set forth.

9. In combination, a divider, a member hinged to the divider to swing laterally, a clearer pivoted to the hinged member for vertical movement at its rear end, a bolt adjustably connected with the divider, a rod having loose connection with the clearer and with said bolt, and springs mounted upon the rod and adapted to permit free vertical and lateral movement of the clearer and to normally hold the latter in a predetermined position, substantially as set forth.

10. In combination, a divider having a rearwardly-extended member, a lug having a journal, means for securing said lug to the rearwardly-extended member, a clearer mounted upon said journal, and a yielding connection between said lug and the divider, substantially as set forth.

In testimony whereof I affix my signature in presence of two witnesses.

JOHN N. WHITTINGHILL. [L. S.]

Witnesses:
WILLIAM F. DECKER,
M. E. DECKER.